(12) United States Patent
Chen

(10) Patent No.: US 8,272,791 B2
(45) Date of Patent: Sep. 25, 2012

(54) OPTICAL FIBER CONNECTOR

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 101 days.

(21) Appl. No.: 12/898,677

(22) Filed: Oct. 5, 2010

(65) Prior Publication Data

US 2011/0188814 A1  Aug. 4, 2011

(30) Foreign Application Priority Data

Feb. 1, 2010  (TW) ............................... 99102841 A

(51) Int. Cl.
*G02B 6/36* (2006.01)
(52) U.S. Cl. ........................................... 385/79; 385/53
(58) Field of Classification Search .................... 385/79, 385/53
See application file for complete search history.

(56) References Cited

U.S. PATENT DOCUMENTS

| | | | | |
|---|---|---|---|---|
| 5,381,495 A | * | 1/1995 | Hu | 385/51 |
| 5,760,711 A | * | 6/1998 | Burns | 340/962 |
| 6,052,056 A | * | 4/2000 | Burns et al. | 340/583 |
| 7,933,012 B2 | * | 4/2011 | Hartmann et al. | 356/246 |
| 2005/0084205 A1 | * | 4/2005 | Hong et al. | 385/22 |
| 2009/0147253 A1 | * | 6/2009 | Hartmann et al. | 356/246 |
| 2009/0252459 A1 | * | 10/2009 | Nielson et al. | 385/79 |
| 2009/0324175 A1 | * | 12/2009 | Everett et al. | 385/72 |

* cited by examiner

*Primary Examiner* — K. Cyrus Kianni
(74) *Attorney, Agent, or Firm* — Altis Law Group, Inc.

(57) ABSTRACT

An optical fiber connector includes a housing, and two lenses. The housing defines two first blind holes each configured for receiving an optical fiber. The two lenses are formed on the housing and each of thelenses is aligned with a corresponding first blind hole. The two second blind holes are defined on the housing and each of the second blind holes run through the housing to the bottom of a corresponding first blind hole allowing air in the first blind hole vent out when the optical fiber is inserted into the first blind hole.

8 Claims, 5 Drawing Sheets

OPTICAL FIBER CONNECTOR

BACKGROUND

1. Technical Field

The present disclosure relates to optical fiber connectors.

2. Description of Related Art

Optical fiber connectors typically include a blind hole behind a lens. The blind hole is used to receive an optical fiber. Since the tip of the optical fiber may not perfectly match the bottom of the blind hole, air gaps may exist between the tip of the optical fiber and the bottom of the blind hole after the optical fiber is inserted into the blind hole. This increases the inefficiency of the optical signal transmission between the lens and the optical fiber.

To overcome this problem, optical cement is used to fill the gap between the tip of the optical fiber and the bottom of the blind hole. One way to fill the optical cement between the tip of the optical fiber and the bottom of the blind hole is to first inject the optical cement into the opening of the blind hole. Then, push the optical cement into the bottom of the blind hole using the optical fiber while inserting the optical fiber into the blind hole. However, because the diameter of the optical fiber is approximately the same as that of the blind hole, the air in the blind hole can be compressed in the hole during the act of inserting the optical fiber. The compressed air in the blind hole will block the optical cement so that the optical cement cannot adequately fill the gap between the tip of the optical fiber and the bottom of the blind hole.

Therefore, an optical fiber connector which can overcome the above-mentioned problems is needed.

DETAILED DESCRIPTION

Figure 1:
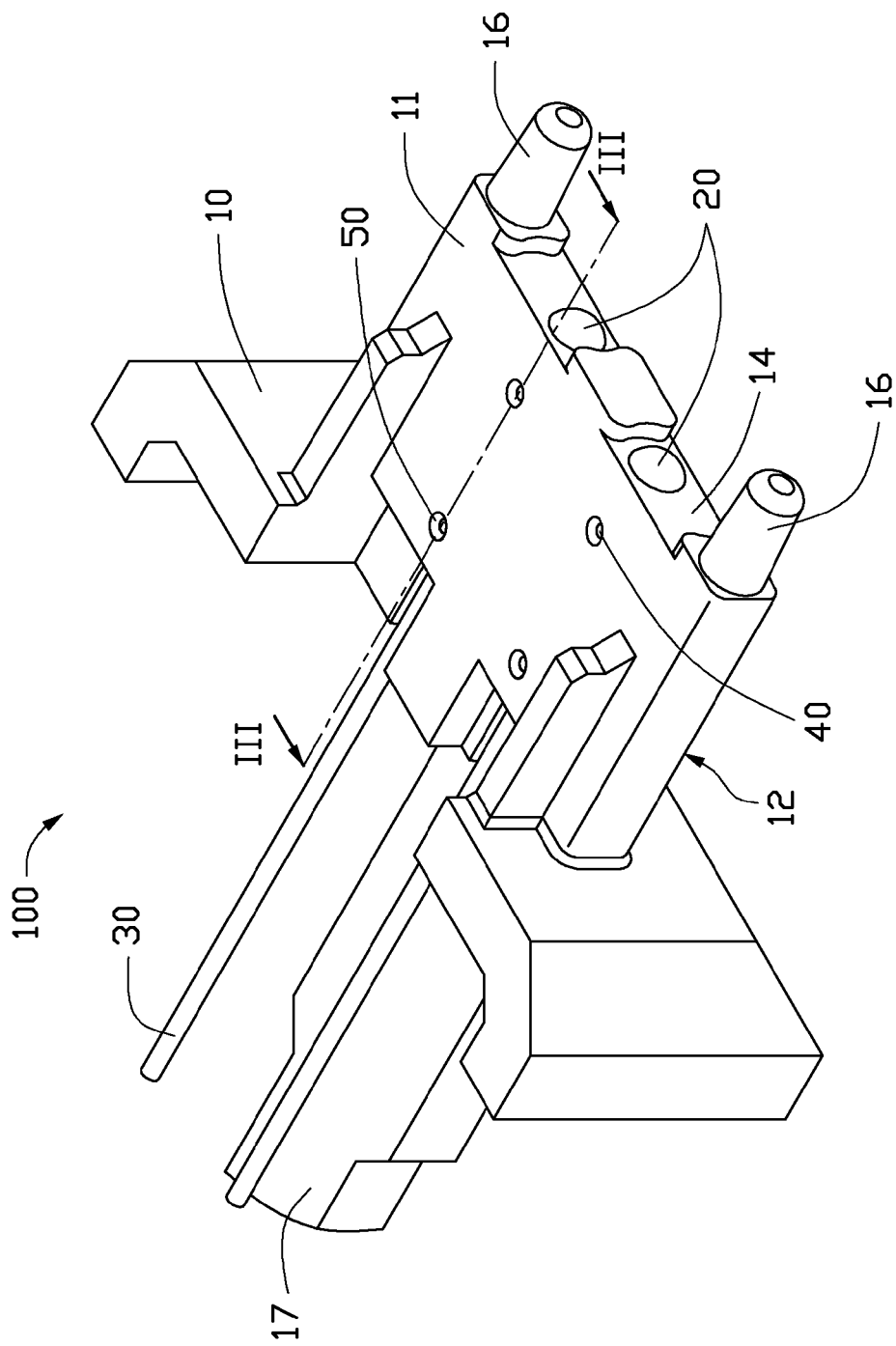
FIG. 1 is an isometric and schematic view of an optical fiber connector according to an exemplary embodiment.
Figure 2:
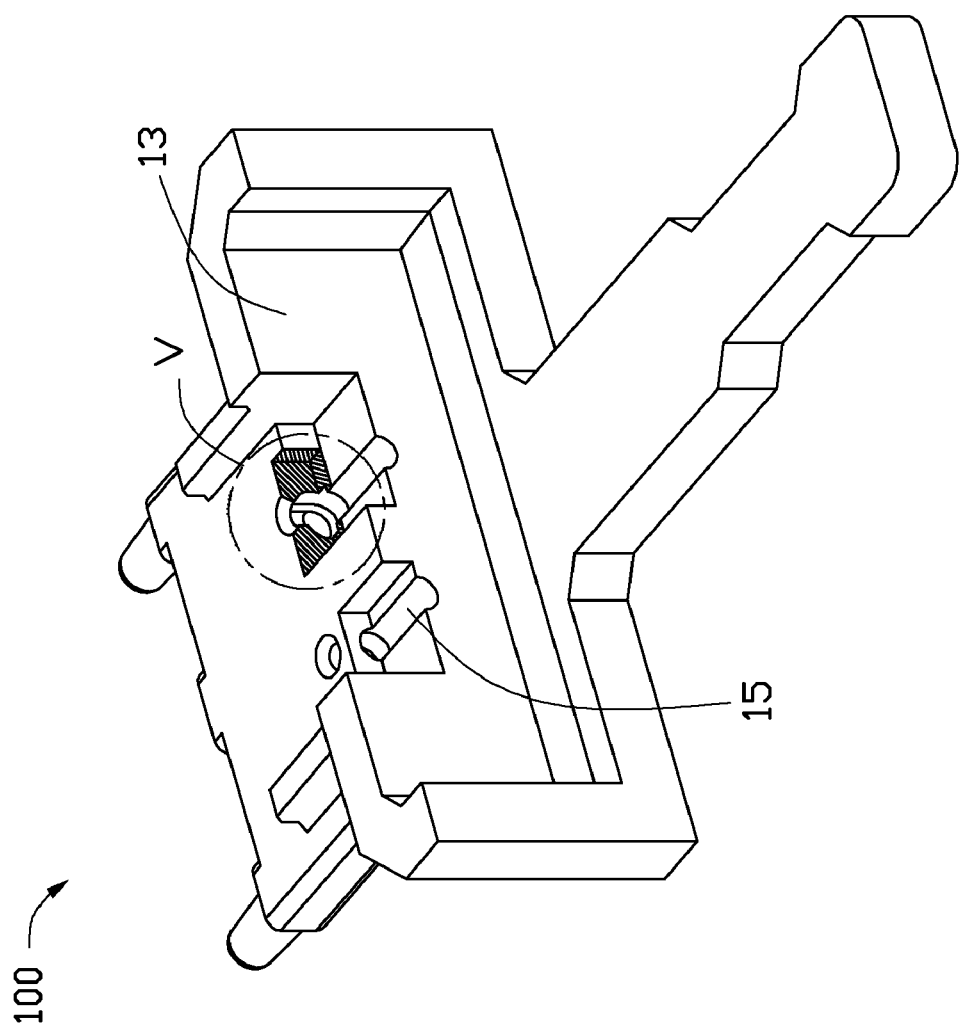
FIG. 2 is similar to FIG. 1, but viewed from another angle.
Figure 3:
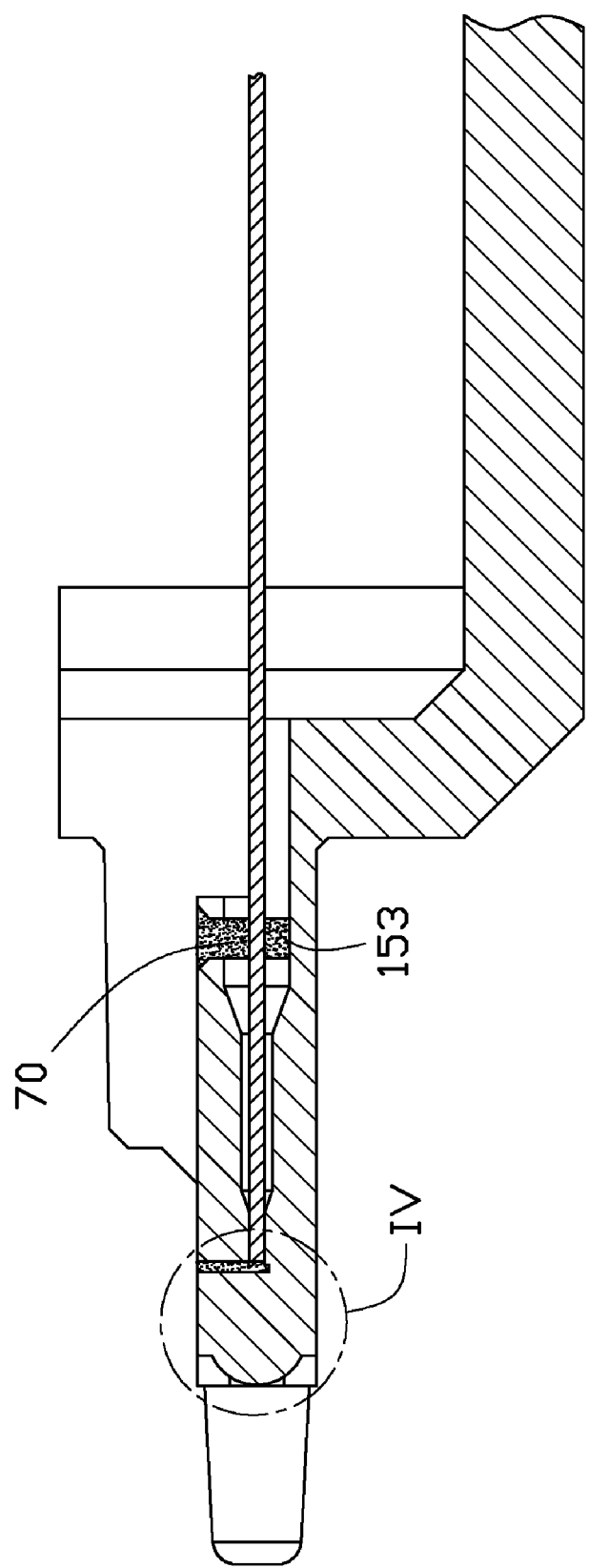
FIG. 3 is a sectional view taken along line of the optical fiber connector of FIG. 1.
Figure 4:
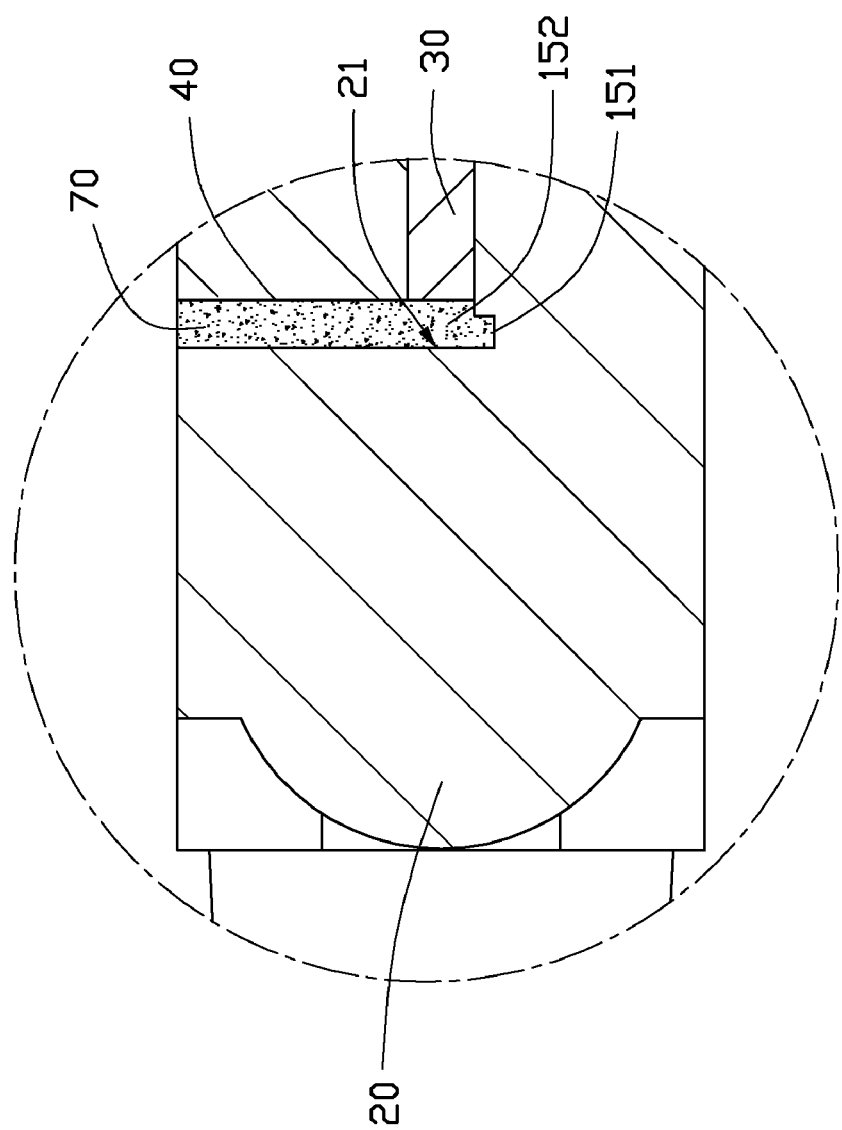
FIG. 4 is an enlarged view of a circled part IV of the optical fiber connector of FIG. 3.
Figure 5:
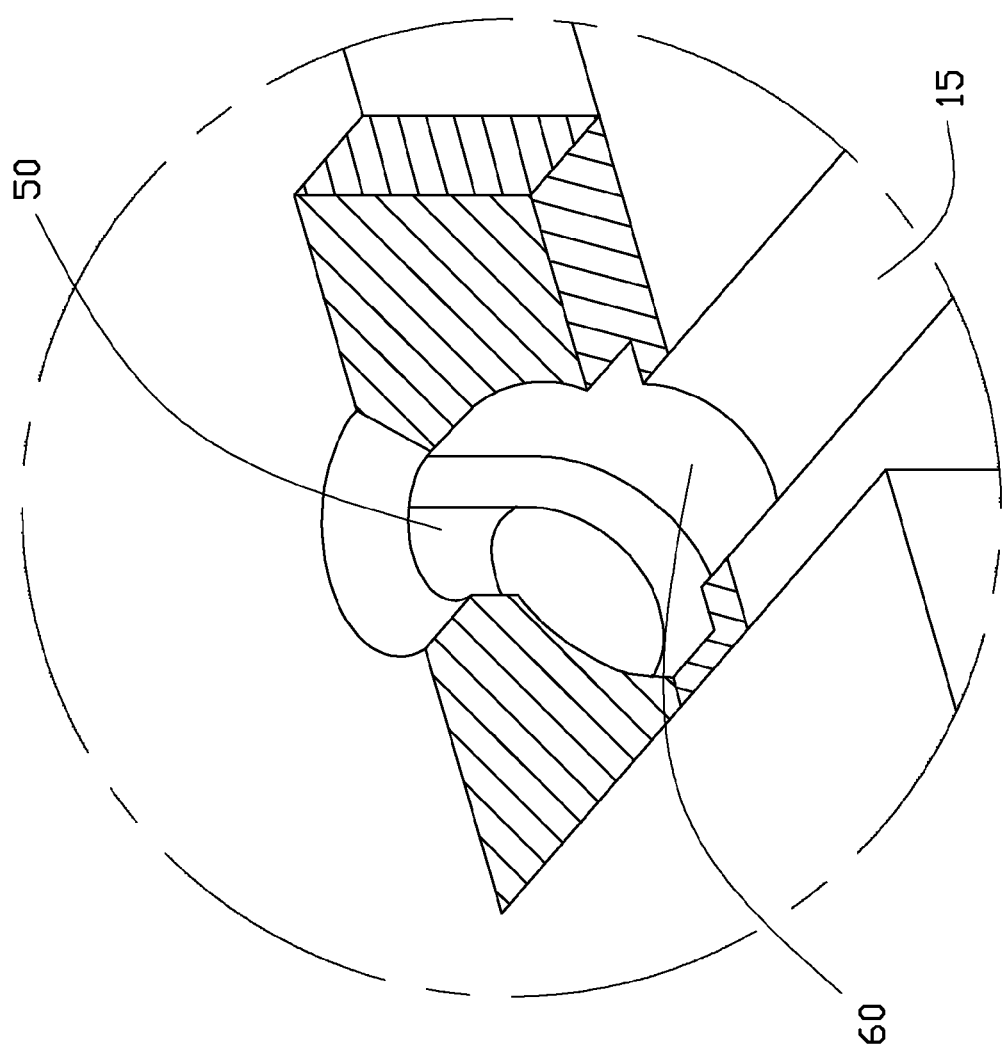
FIG. 5 is an enlarged view of a circled part V of the optical fiber connector of FIG. 2.

Referring to FIGS. 1 to 5, an optical fiber connector 100, according to an exemplary embodiment, includes a housing 10, two lenses 20 and two optical fibers 30.

The housing 10 includes a first surface 11, a second surface 12 opposite to the first surface 11, a third surface 13 and a fourth surface 14 opposite to the third surface 13. The first surface 11 is substantially parallel to the second surface 12. The third surface 13 and the fourth surface 14 respectively connect to the first surface 11 and the second surface 12.

The housing 10 defines two substantially parallel first blind holes 15 for receiving the optical fibers 30. Each first blind hole 15 extends from the third surface 13 to the fourth surface 14. In other embodiments, the number of first blind holes 15 may be different depending on the practical use of the optical fiber connector 100.

Each first blind hole 15 further defines a cylindrical bottom portion 151 used to contain a first adhesive 152. The central axis of each bottom portion 151 coincides with that of the corresponding first blind hole 15. The diameter of each bottom portion 151 is greater than that of the corresponding first blind hole 15. The first adhesive 152 has a refraction index that is the same as that of the housing 10. In other embodiments, the central axis of the bottom portion 151 may not coincide with the central axis of the blind hole 15. The bottom portion 151 may be formed in other shapes, the diameter of each cylindrical bottom portion 151 may equal to that of the corresponding first blind hole 15, and the refraction index of the first adhesive 152 may be different than that of the housing 10.

Each lens 20 is integrally formed with the housing 10 on the fourth surface 14 and optically coupled with a corresponding first blind hole 15. Each lens 20 has a lens surface 21 exposed at the bottom portion 151 of the first blind hole 15. An optical axis of each lens 20 coincides with a central axis of the corresponding first blind hole 15. In this embodiment, two plugs 16 protrude from the fourth surface 14 and are configured for fixing the optical fiber connector 100 while the optical fiber connector 100 is being used.

Corresponding to each first blind hole 15, the housing 10 defines a second blind hole 40 in the first surface 11. The second blind hole 40 runs through the housing 10 from the first surface 11 to the corresponding bottom portion 151. The second blind holes 40 are used to allow the air in the first blind holes 15 to vent out of the housing 10 when the optical fiber 30 pushes the first adhesive 152 into the cylindrical bottom portion 151. By configuring the second blind holes 40, the compressed air in the second blind holes 40 can vent from the second blind holes 40 during the assembly process of the optical fiber 30. Furthermore, an air-extraction device can be used to extract the compressed air in the first blind hole 15 from the second blind holes 40 when the optical fibers 30 are inserted into the first blind holes 15. In this embodiment, the first adhesive 152 can be adequately filled between the tips of the optical fibers 30 and the lens surface 21 of the lens 20. Therefore, the present optical fiber connector 100 can greatly increase the efficiency of optical signal transmission between the lenses 20 and the optical fibers 30.

Corresponding to each first blind hole 15, the housing 10 further defines a third blind hole 50 and a U-shaped recess 60. The third blind hole 50 runs through the housing 10 from the first surface 11 to the corresponding first blind hole 15 and is in communication with the corresponding first blind hole 15. The third blind holes 50 are used to allow a second adhesive 153 to be injected into the first blind hole 15 and to be filled between the sidewall of the optical fiber 30 and the inner wall of the first blind hole 15 to bond the optical fiber 30. The U-shaped recess 60 is defined in the inner sidewall of the first blind hole 15 and spatially corresponding to the third blind hole 50. The U-shaped recess 60 is in communication with the third blind hole 50 and is configured for providing an extra space for the second adhesive 153 introduced from the third blind hole 50 to surround the optical fiber 30. In this embodiment, the third blind holes 50 are formed to be funnel-shaped to match an injection head for injecting the second adhesive 153. In other embodiments, the third blind holes 50 may be formed to be other shapes, such as cube-shaped, or cylinder-shape. By configuring the third blind holes 50 and the U-shaped recess 60, the second adhesive 153 can be quickly and easily injected into the first blind hole 15 and uniformly surround the sidewall of the optical fiber 30 after the optical fiber 30 is inserted into the first blind hole 15. Therefore, strong adhesion of the optical fiber 30 can be achieved.

After finishing the assembly of the optical fiber connector 100, the second blind hole 40 and the third blind hole 50 may be filled by a filling member 70. In this embodiment, the first adhesive 152, the second adhesive 153 and the filling member 70 are the same material. In other embodiments, the material of the first adhesive 152, the second adhesive 153 and the filling member 70 may be different.

The housing 10 further includes a grip 17 protruding from the third surface 13. When the optical fiber connector 100 is used, the optical fiber connector 100 can be assembled into an electronic device such as a notebook or a digital camera by griping the grip 17.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector, comprising:
    an optical fiber;
    a housing defining a first blind hole receiving the optical fiber, a second blind hole, a third blind hole and a U-shaped recess, the second blind hole distinctly oriented from the first blind hole and running to a bottom portion of the first blind hole, the U-shaped recess defined in the inner sidewall of the first blind hole and spatially corresponding to the third blind hole, the third blind hole distinctly oriented from the first blind hole and running to the U-shaped recess;
    a lens formed in the housing and aligned with the first blind hole, the lens having a lens surface exposed at the bottom portion of the first blind hole; and
    a first adhesive applied in the bottom portion of the first blind hole between the lens surface and the optical fiber; wherein the second blind hole is configured to allow venting of air in the first blind hole therefrom during insertion of the optical fiber into the first blind hole and the third blind hole is configured to introduce a second adhesive into the U-shaped recess to fix the optical fiber.

2. The optical fiber connector of claim 1, further comprising a filling member filling the second blind hole.

3. The optical fiber connector of claim 2, wherein the first adhesive, the second adhesive and the filling member are made from a same material.

4. The optical fiber connector of claim 1, wherein the lens is integrally formed with the housing.

5. The optical fiber connector of claim 4, wherein a central axis of the cylindrical bottom portion coincides with that of the optical fiber.

6. The optical fiber connector of claim 1, wherein the bottom portion of the first blind hole is substantially cylindrical.

7. The optical fiber connector of claim 1, wherein the first blind hole is substantially perpendicular to the second blind hole.

8. The optical fiber connector of claim 1, wherein the first blind hole is substantially parallel to the third blind hole.

* * * * *